United States Patent [19]

Kaul

[11] Patent Number: 4,667,196

[45] Date of Patent: May 19, 1987

[54] ACTIVE VISUAL DISPLAY SYSTEM FOR REMOTE THREE-AXIS FLIGHT PATH GUIDANCE OF LANDING AIRCRAFT

[76] Inventor: Charles E. Kaul, 7101 Galgate Dr., Springfield, Va. 22152

[21] Appl. No.: 620,088

[22] Filed: Jun. 13, 1984

[51] Int. Cl.$^4$ .......... B64D 45/08; B64F 1/18
[52] U.S. Cl. .......... 340/954; 73/178 T; 340/948; 340/952; 340/953; 340/968; 342/410; 342/33; 342/34
[58] Field of Search .......... 340/947, 948, 951–955, 340/972, 979, 976, 981, 982, 958, 968; 364/428–430, 432–434, 460; 362/62; 343/410, 413, 416, 5 LS, 5 GC; 244/114 R; 73/178 T, 178 R

[56] References Cited

U.S. PATENT DOCUMENTS

| | | | |
|---|---|---|---|
| 3,152,316 | 10/1964 | Baxter et al. | 340/954 |
| 3,183,479 | 5/1965 | Austin | 340/954 |
| 3,345,017 | 10/1967 | Olah | 364/429 |
| 3,624,366 | 11/1971 | Angus | 364/430 |
| 3,711,826 | 1/1973 | La Russa | 340/979 |
| 3,789,661 | 2/1974 | Melsheimer | 73/178 T |
| 3,806,934 | 4/1974 | Hays, Jr. | 340/976 |
| 3,925,750 | 12/1975 | Gilbert et al. | 340/979 |
| 3,935,557 | 1/1976 | Nichols | 340/948 |
| 4,050,069 | 9/1977 | Schlussler | 343/5 GC |
| 4,158,885 | 6/1979 | Neuberger | 340/981 |
| 4,210,930 | 7/1980 | Henry | 343/410 |
| 4,250,746 | 2/1981 | Vassie et al. | 73/178 T |
| 4,272,766 | 6/1981 | Stucker et al. | 340/948 |
| 4,414,532 | 11/1983 | Kaul | 340/953 |
| 4,454,510 | 6/1984 | Crow | 343/5 GC |
| 4,463,355 | 7/1984 | Schultz et al. | 340/971 |

Primary Examiner—James L. Rowland
Assistant Examiner—Brent A. Swarthout
Attorney, Agent, or Firm—William F. Frank

[57] ABSTRACT

An active, electro-optical display system for use on fixed-wing, land-based airport runways, is disclosed for remotely guiding a pilot during visual approach and landing of an aircraft. Conventional Microwave Landing System (MLS) ground-transmitted data is air-derived on board the aircraft and data-linked to a ground receiver to produce a continuous digital data signal indicative of aircraft slant range, elevation and azimuth relative to the desired landing position. The resulting data signal is electrically coupled to a signal processor governed in accordance with control guidance laws to produce three discrete signals indicative of the magnitude and direction of the descent rate error, the flight path acceleration, and the lateral drift rate of the aircraft relative to the intended landing area. The three control signals are respectively coupled to display drivers which produce a plurality of drive signals for energizing individual light cells in horizontally oriented linear arrays located adjacent to the runway. The resulting light signals provide a continuous visual indication of the flight path acceleration and flight path angular error, in the elevation and azimuth planes, for appropriate corrective action by the pilot.

4 Claims, 8 Drawing Figures

ACTIVE VISUAL DISPLAY SYSTEM FOR REMOTE THREE-AXIS FLIGHT PATH GUIDANCE OF LANDING AIRCRAFT

BACKGROUND OF THE INVENTION

The present invention relates to remote visual landing aid systems for guidance of aircraft during final approach and in particular to an active, electro-optical display system for enhancing visual cueing information projected to the pilot of an approaching aircraft from the point of intended landing on an airport runway. Successful aircraft landings, particularly night time operations into short runways and into airports with long, overwater approach patterns extending into a surrounding body of water, necessitate the highest degree of safety and control to ensure maximum protection for passengers, cargo and aircrew.

In seeking to provide that degree of safety and control, passive visual landing and approach lighting systems were developed to guide pilots on approach to runways, particularly during the hours of darkness. One such visual landing aid system is the International Civil Aviation Organization (ICAO) worldwide standard for commercial aircraft operations, the Visual Approach Slope Indicator (VASI) system. The VASI provides passive glideslope displacement information (position) through color-coded projected beams of light which indicate to the pilot whether the aircraft is above, below or correctly on the proper glide path angle.

A newer passive visual landing aid, the Precision Approach Path Indicator (PAPI) is in widespread use and operates in accordance with the same basic optical projection principles as does the VASI.

While the angular elevation information provided by VASI is valuable as an altitude reference, the system has proven to be limited in usefulness in providing trend or direction and rate of change information relative to the optimum glideslope. Because the information provided by the VASI is of zero order (displacement only) there are substantial time lags between aircraft control inputs and subsequent observable changes in the VASI display. In particular, relatively large descent rate perturbations are required before noticeable color changes are apparent. Trend or rate information is thus derived only through a time history (several seconds) of observing the display. From a human factors engineering perspective, the piloted landing process can be described as a second or third order closed loop manual control task. For maximum effectiveness, a visual display for accurate closed-loop control should more closely simulate the control order and dynamics of the feedback loop between pilot control input and aircraft dynamic response. It is thus advantageous to augment position information with instantaneous velocity and acceleration cues.

Furthermore, the inherent limitations of the VASI are accentuated at night, when there is a severe reduction in the natural visual cues used by the pilot to assist in estimation of azimuth and elevation rates of change. The nighttime reduction in these natural cues used by the pilot, such as expansion pattern relationships, surface texture gradients, peripheral streaming, and horizontal field-of-view discrimination adversely affects the pilot's perceptual capabilities rendering accurate control of azimuth and elevation rates far more difficult than during daylight. In fact, the apparent tendency to "duck under" the VASI glideslope at night on long, overwater approaches has been documented as a contributive factor in several commercial air transport landing accidents.

The present invention attempts to overcome this deficiency of previous passive visual landing aids by adding active, real-time, higher order derivative information to the zero order VASI position information (passively displayed for fail safety considerations) in an integrated format that minimizes distraction and reduces pilot workload.

Accordingly, it is thus a general purpose and object of the present invention to provide an improved visual landing aid system for remotely guiding the descent approach of a fixed-wing aircraft to a conventional airport runway, in such a manner that does not add significant vertical obstructions to the landing area.

Another object of the present invention is to provide an optical display system for remote guidance of aircraft landings, wherein visual presentation of information more closely simulates the control order and dynamics of the actual feedback loop between the pilot command and the aircraft response.

Still another object of the present invention is to provide an active optical display system that augments the passive VASI or PAPI systems presently used to guide aircraft landings by enhancing the visual cueing information presented to the pilot through the addition of a continuous visual indication of the instantaneous magnitude and direction of aircraft descent rate relative to the optimum descent rate (that which maintains or intercepts the desired glideslope angle).

Another object of the present invention is to provide a continuous indication of instantaneous velocity change along the flight path (deceleration or kinetic energy dissipation) to provide enhanced wind shear warning and detection.

Still another object is to provide a continuous indication of instantaneous lateral drift rate relative to the runway centerline.

A further object of the present invention is to provide a remote visual landing aid for aircraft approaches that facilitates tracking of the desired glideslope during night operations so that the risks of landing accidents are significantly reduced.

SUMMARY OF THE INVENTION

Briefly, these and other objects of the invention are accomplished by an active, multi-element electro-optical display system for location adjacent to the intended runway landing position on conventional land-based runways for remotely guiding a pilot in the approach and landing of a fixed-wing aircraft. Microwave landing system (MLS) azimuth and elevation guidance signals are transmitted in the international standard format by ground based equipment, decoded and processed by a receiver located in the aircraft. These signals, together with range to touchdown data obtained from conventional or precision Distance Measuring Equipment (DME) and the discrete aircraft identity, are digitally encoded and transmitted to the ground display data-link receiver. The received digital data signal is electrically coupled to a signal processor governed in accordance with multiple control guidance algorithms to produce three digital control signals having amplitude and polarity, respectively indicative of:

(1) The magnitude and direction of error in the appropriate descent rate of the aircraft relative to the desired flight path angle.

(2) The magnitude and direction of change in the appropriate aircraft kinetic energy; the kinetic energy dissipation rate.

(3) The magnitude and direction of the aircraft lateral drift rate relative to the extended runway centerline.

Each digital signal is electrically coupled via common digital data bus to a separate display driver and converted therein to a continuous analog signal. Based on the resulting continuous analog signal, each display driver produces a plurality of drive signals for energizing discrete light cells in each of three horizontally oriented display arrays, providing a continuous visual indication, respectively, of flight path error through instantaneous measures of descent rate error, rate of change in kinetic energy state or path acceleration, and lateral drift rate. The continuously displayed flight path error enables appropriate corrective action by the pilot.

The preferred arrangement of the descent rate and acceleration array elements is a horizontal orientation in the ground plane, parallel to the runway centerline and adjacent to the intended landing area. It is preferable, but not mandatory, to co-locate these two display elements with a conventional VASI installation to provide a fixed datum reference and independent position (elevation angle) information. The drift rate arrays are arranged to extend laterally in the horizontal plane symmetrically about and perpendicular to the fixed runway edge lights at the approach threshold.

The descent rate display consists of two linear arrays of discrete signal lights arranged in a horizontal line perpendicular to the VASI light bars and parallel to the runway centerline. The upwind array originates from the midpoint of the upwind VASI light bar and extends further upwind, while the second array originates from the midpoint of the downwind VASI bar and descends further downwind. As the approaching aircraft ascends or descends relative to the optimum flight path, the upper or lower arrays illuminate respectively to indicate the magnitude and direction of the appropriate sink rate error. The number of light cells illuminated in the array is directly proportional to the magnitude of descent rate error. Each cell is activated at a discrete threshold corresponding to the amplitude of the input signal, and each cell remains illuminated continuously, provided the error signal is equal or greater in magnitude to its respective activation threshold. The upwind and downwind arrays are identical in composition and energized similarly, differing only in the polarity of their respective activation signals. Positive polarity signals indicating insufficient descent rate, drive the upwind array, while negative polarity signals, indicating excessive descent rate, illuminate the downwind display. The intensity of the cells must be carefully matched to ambient day/night light intensity to provide the proper indication to the pilot. Additionally, the spacing of cells must be such that throughout the normal viewing range down to the minimum useful range (approximately 200 feet) the arrays of discrete cells appear as continuous bars when projected perpendicularly in a vertical plane at the midpoint of the upwind and downwind VASI bars. Excessive spacing results in lost fidelity because the display breaks apart too early in the approach, while insufficient spacing adds unnecessary costs and complexity. Total length of the arrays is arbitrary, although length is directly proportional to the maximum useful acquisition range by the approaching aircraft. Two hundred and fifty feet typically would provide five nm—(defined in the Third Edition of Websters International Dictionary as nautical miles) of useful range.

The energy rate display consists of two linear arrays of discrete signal lights also parallel to the runway centerline, extending upwind perpendicularly from the endpoints of the downwind VASI bar to connect with the endpoints of the upwind VASI bar, forming in effect a closed rectangle. Acceleration-induced increases in the velocity of the approaching aircraft produce positive polarity signals which illuminate both outboard and inboard acceleration arrays symmetrically and sequentially upwind originating from the downwind VASI bar and terminating with full deflection at the midpoint between the VASI bars.

Conversely, deceleration of the approaching aircraft produces negative polarity signals which symmetrically energize both arrays in a downwind sequence, originating from the upwind VASI bar with full deflection at the midpoint between the VASI bars. The number of cells continuously illuminated is directly proportional to the magnitude of acceleration or deceleration up to the maximum number, typically 10, corresponding to full-scale deflection. In similar fashion to the descent rate display, each cell in the acceleration arrays is amplitude and polarity sensitive and remains continuously illuminated provided the input signal magnitude exceeds its respective threshold.

The preferred arrangement of the drift rate display consists of two linear arrays of closely-spaced discrete signal lights oriented perpendicular to the runway centerline immediately downwind of the runway threshold. The arrays extend laterally to the left and right of the fixed runway edge lights.

Left to right lateral drift of the aircraft produces positive polarity signals which illuminate cells from left to right in the right drift rate array, originating from the aforementioned right runway edge to an arbitrarily selected limit. Conversely, right to left aircraft drift produces negative polarity signals which illuminate light cells from right to left in the left drift rate array, originating from the left runway edge to an equivalent arbitrary limit.

As before, the number of cells continuously illuminated is proportional to the magnitude of left or right drift rate. Each cell is amplitude and polarity sensitive, remaining continuously illuminated provided the input signal magnitude exceeds its respective threshold.

For a better understanding of these and other aspects of the present invention, reference may be made to the following detailed description taken in conjunction with the drawings in which like reference numerals designate like parts throughout the figures thereof.

DESCRIPTION OF THE PREFERRED EMBODIMENT

Figures 1A, 1B:
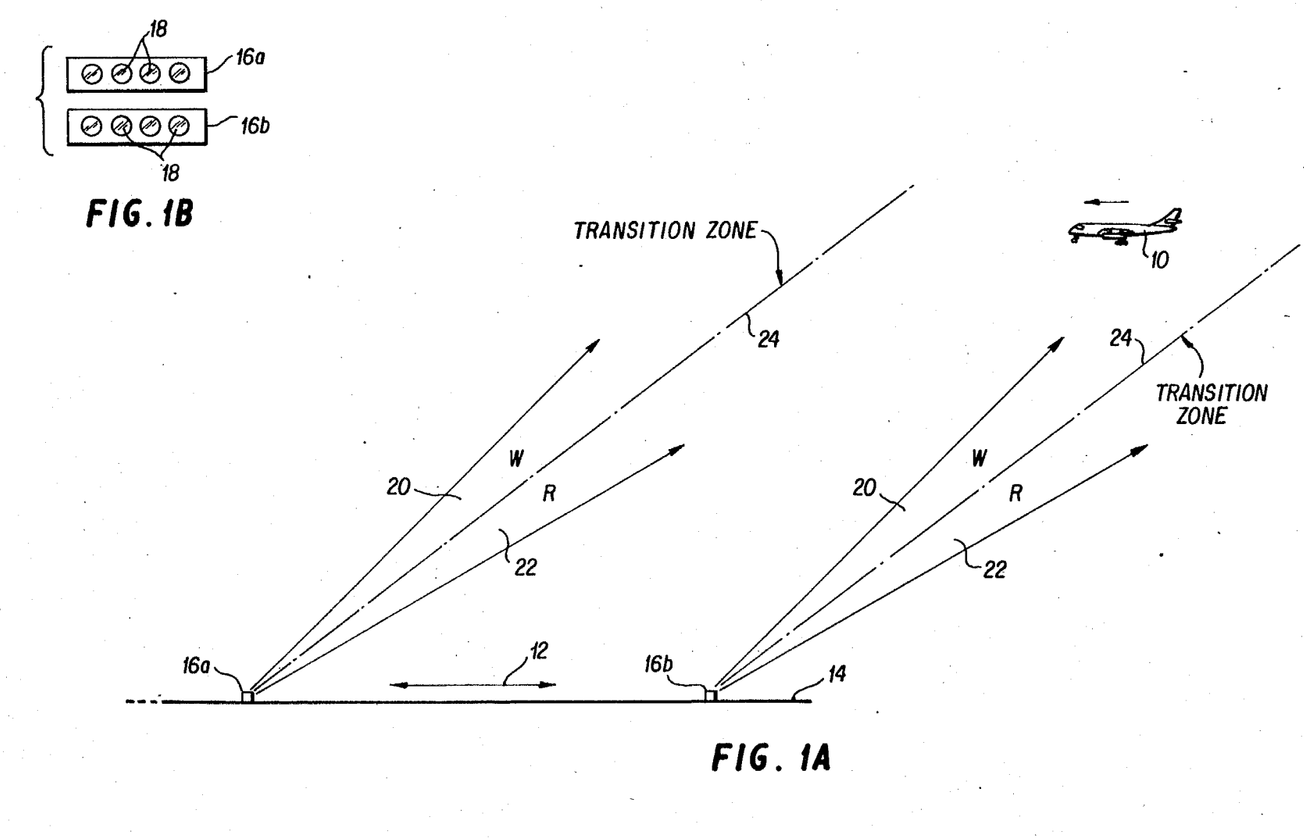
FIG. 1A is a profile view of a visual aircraft approach to a typical runway using a conventional VASI display to provide landing guidance.
FIG. 1B is a plan view of typical VASI display light bar fixtures.

Referring now to FIG. 1A there is shown a fixed wing aircraft 10 in a descent approach to the landing area 12 of a conventional airport runway 14. Located adjacent to the landing area 12 of the runway 14 are VASI displays 16a and 16b conventionally used to guide aircraft landings by providing pilots with primary glideslope displacement information. The VASI displays 16a and 16b consist of a pair of transverse light bars better shown in FIG. 1B. The horizontal light bars 16a and 16b are composed of a plurality of individual red and white light sources 18, electrically interconnected and energized to provide a continuous visual projection of the desired slideslope reference line during landing operations. In accordance with generally known optical techniques, each unit 18 emits a beam of light, the upper part of which is white 20 and the lower red 22. There is a changeover zone in the beam which is seen by the pilot as various shades of pink. All the units in a bar are set up the same angle of elevation and there is a differential, typically half a degree, between the upwind and downwind bars. The VASI system thus consists of a slightly converging corridor defined by the lighting signals emitted from the bars. If the aircraft is within the approach slope corridor the pilot sees the upper bars as red and the lower as white. If the aircraft goes below the corridor both bars are seen red and if it is above the corridor, both bars are seen as white. The corridor is typically 25–30 ft deep at the threshold. The presence of the pink zone 24 between the red and white beams means that the changeover from on-slope to off-slope is seen as a gradual process by pilots when they reach the boundaries of the approach slope corridor.

Figure 2:
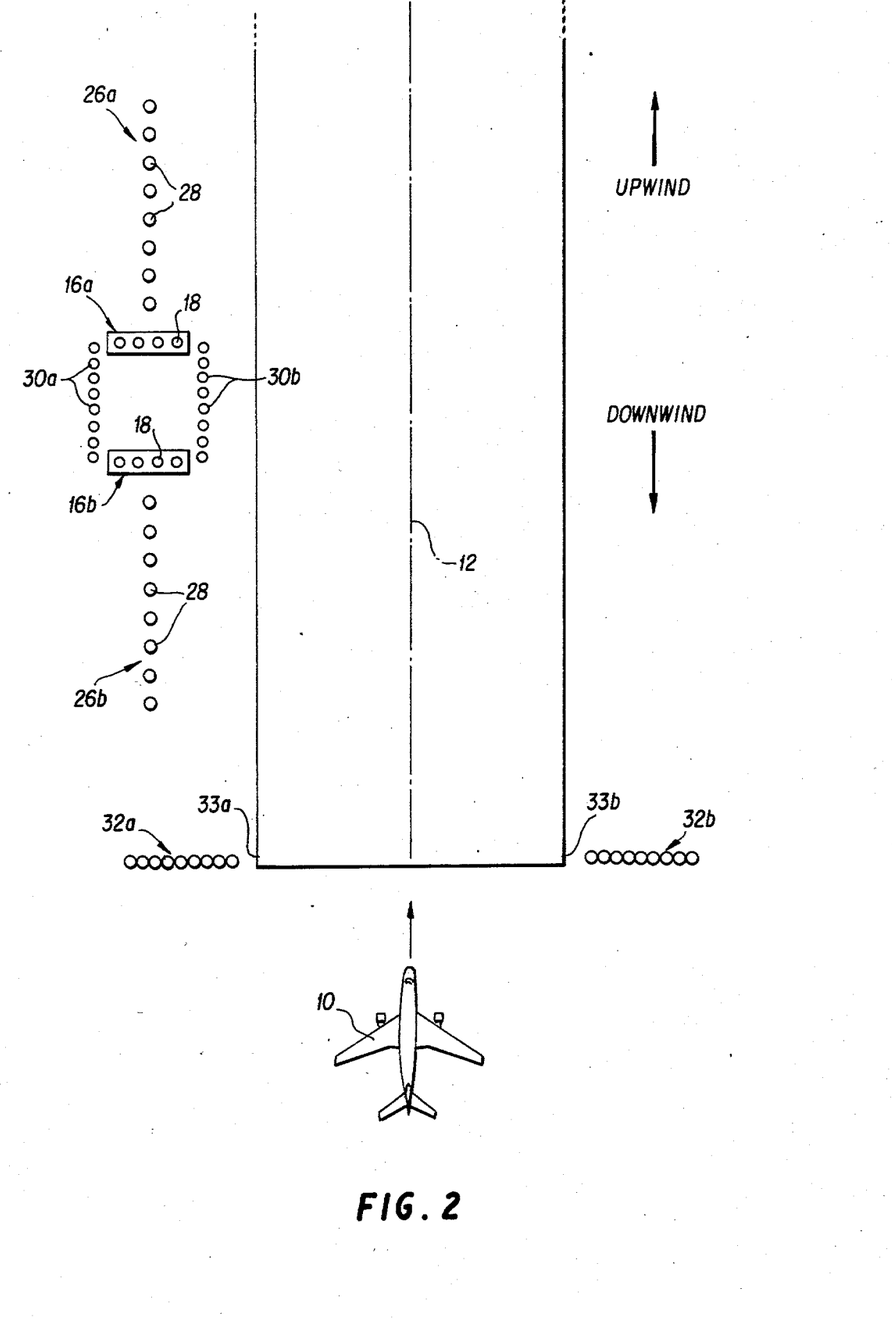
FIG. 2 is an overhead view of a typical VASI runway installation to which light arrays configured in accordance with the electro-optical display system of the present invention have been added.

Referring now to FIG. 2, a set of two linear light arrays 26a and 26b is shown in association with the conventional VASI display 16a and 16b. The arrays 26a and 26b each consisting of a series of discrete light cells 28 in a linear configuration, are horizontally oriented and arranged symmetrically both upwind and downwind of the VASI bars 16a and 16b. Preferably joined perpendicularly at the midpoint of bars 16a and 16b, the horizontal arrays 26a and 26b are fixed so that the upwind array 26a is substantially parallel to the runway centerline and substantially aligned with the respective downwind array 26b. The additional arrays 30a and 30b, also consisting of a series of similar discrete light cells 28 in a linear configuration, are oriented parallel to the runway, joining the downwind bar 16b to the upwind bar 16a. Array 30a extends from the outboard end (relative to the runway) of bar 16a to the outboard end of bar 16b, and array 30b extends from the inboard end of bar 16a to the inboard end of bar 16b.

Referring again to FIG. 2, a set of two additional arrays 32a and 32b is shown attached to the runway threshold, arranged perpendicular to the runway centerline and extending laterally to the left and right of the respective runway edges 33a and 33b. The light cells 28 in each of the horizontal arrays 26a, 26b, 30a, 30b, 32a and 32b are independently connected to be energized by a respective one of a plurality of voltage drive signals, as described in greater detail hereinafter in reference to FIG. 3. The light cells 28 should be of a uniform color, preferably green, selected on the basis of high relative detection and recognition levels and conflict avoidance with the existing red and white color configuration of the VASI display 16a and 16b.

Referring further to FIG. 2, the light cells 28 of the horizontally oriented light arrays 26a and 26b, 30a and 30b, are energized in succession, in accordance with the present invention so as to appear as bars or continuous arrows extending upwind or downwind from the VASI bars 16a and 16b, thereby providing continuous visual cues of magnitude and direction of descent rate and flight path acceleration for appropriate pilot response.

The light cells 18 in the lateral arrays 32a and 32b of the azimuth guidance element are similarly energized in succession so as to appear as bars or as continuous arrows emanating perpendicularly left and right from the respective runway edges 33a and 33b, providing continuous visual cues of magnitude and direction of lateral drift rate.

Figure 3:
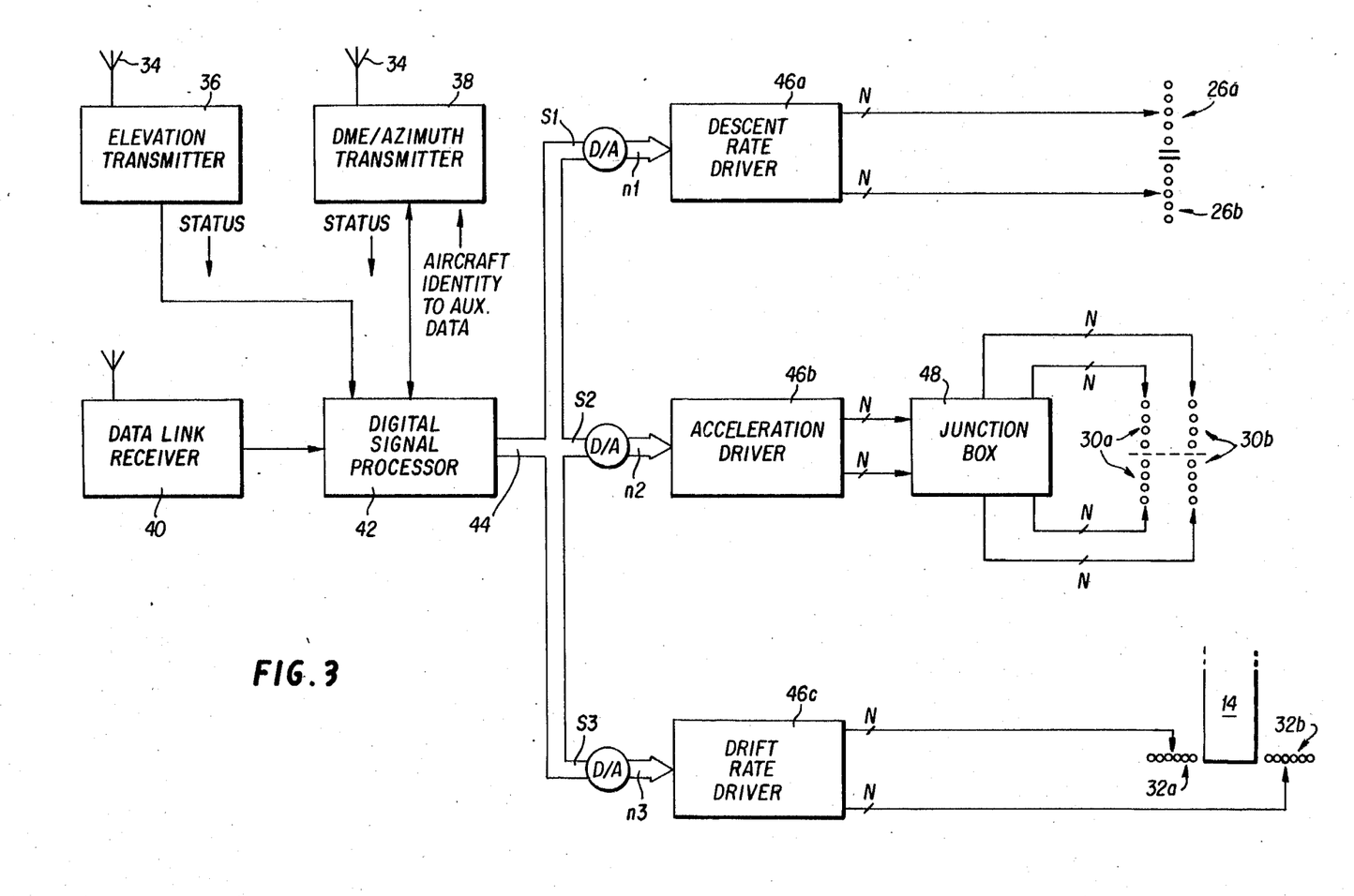
FIG. 3 is a block diagram of the ground subsystem of the present invention including the light arrays of FIG. 2.

Referring now to FIG. 3 in conjunction with FIG. 2, both FIGs comprise the ground subsystem of the present invention. A conventional MLS ground station 34 consisting of elevation transmitter 36 and azimuth/DME units 38 transmits ICAO standard precision angle and distance guidance signals throughout the approach corridor (MLS characteristics are described in detail in specification FAA-ER-700-08C).

An airborne subsystem described in greater detail hereinafter in reference to FIGS. 6 and 6A, receives, interprets and relays the precision range and guidance signals, together with the discrete aircraft encoded identity, back to the ground data link receiver 40 of FIG. 3. The data link receiver 40 passes the received azimuth, elevation, range and identity data in serial digital form to a signal processor 42. Signal processor 42 is a conventional digital device such as a digital computer or microprocessor, capable of receiving selected digital data and performing functional calculations thereupon in accordance with control algorithms. The digital processor 42 monitors the status of the MLS ground station units and processes the received digital data in real-time in accordance with a sequence of three control guidance algorithms, one for each of the respective display elements.

Each discrete digital control guidance signal S1, S2, and S3 that results is transmitted in sequence with appropriate address via a common digital data bus 44 to its respective display element driver. Each of the three driver units 46a, 46b and 46c, converts the received serial digital data stream into a continuous analog signal through a digital to analog converter of conventional design. The resultant analog signals n1, n2 and n3 are used for energizing light cells in the display element arrays. The three control guidance signals are computed in digital processor 42 according to the algorithms hereinafter described below.

DESCENT RATE SIGNAL PROCESSING

Figure 4:
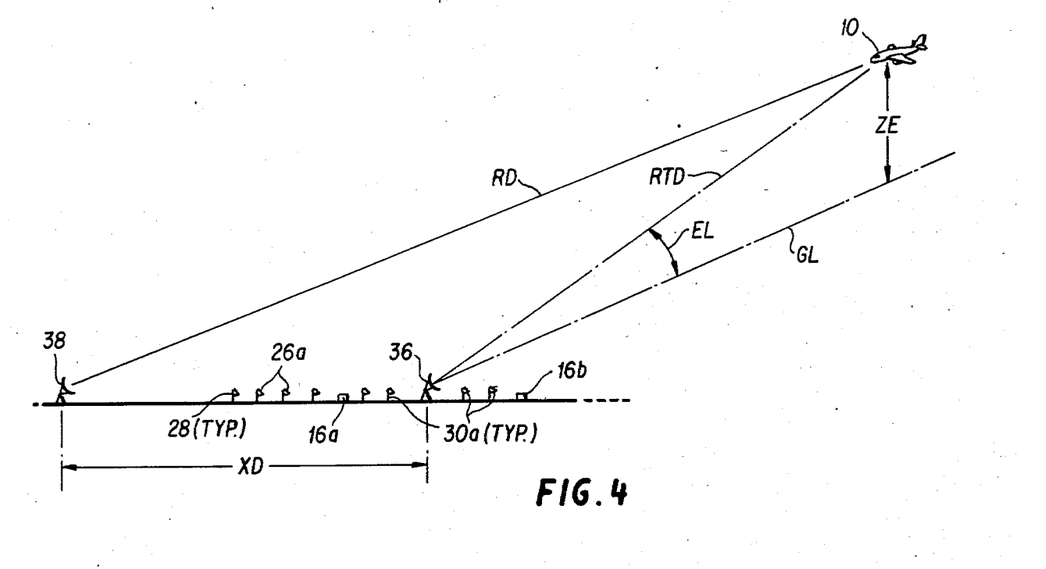
FIG. 4 is a general illustration in the elevation plane of an aircraft approach using the display system of FIG. 2, depicting the reference nomenclature thereof.

With reference to FIG. 4, the descent rate signal processing is governed according to a control algorithm which computes a driving signal for energizing the light cells in the descent rate arrays in proportion to the difference between the instantaneous descent rate (as derived from MLS data) of aircraft 10 and an ideal descent rate, further providing upwind energization of the light cells when the actual descent rate is insufficient and downwind when it is excessive. The ideal descent rate as defined hereinafter specifies that null indications on the horizontal descent rate arrays 26a and 26b of FIG. 2 would return the aircraft at an appropriate rate, or maintain it on the desired glideslope angle GL. In accordance with the descent rate algorithm, the digital error signal S1 that determines the corresponding number of lights energized in the arrays is proportional in magnitude and polarity to the difference between the actual and computed optimum rates of return to the transmitted MLS glideslope GL (assumed coincident with the centerline of the VASI approach corridor) as follows:

$$S1 = (K1) \times (G1) \times \left[ \frac{d}{dt} (ZE) + (KZ)(ZE) \right], \text{ft/sec}$$

where

K1 = a constant scale factor, non-dimensional
G1 = (RTD+RB)/RD, range-variable gain factor, non-dimensional
RD = MLS derived slant range (DME) from azimuth/DME transmitter 38 to aircraft 10, ft
RTD = slant range from aircraft 10 to MLS elevation transmitter 36 (corrected by offset distance XD), ft
RB = arbitrary bias range (RB < XD), ft
KZ = lead-equalization time constant, aircraft dependent (sec$^{-1}$), (KZ = 0.5 typical)
ZE = MLS derived altitude error, ft.
ZE = (EL) × (RTD), small-angle approximation (positive above the glideslope)
EL = MLS derived elevation angular error, rad (positive above the glideslope)

The continuously updated time-derivative of the altitude error, d/dt (ZE) is generated in the signal processor by a conventional recursive routine commonly known as an ALPHA-BETA digital filter. This processing provides constant first-order lead equal to 1/KZ (sec), and range varying display gain that tapers off with decreasing range RTD.

ACCELERATION (ENERGY CHANGE) SIGNAL PROCESSING

With reference again to FIG. 4, the kinetic energy dissipation status of the approaching aircraft 10 as determined by processed DME data is used to provide situation-cue inputs to the acceleration arrays 30a and 30b. The acceleration display is governed by a digital signal S2 computed in signal processor 42 as:

$$S2 = \frac{(K2) \times (V)}{g} \times \frac{(dV)}{dt}, \text{ft/sec}$$

where
K2 = non-dimensional display gain
g = gravitational acceleration constant, ft/sec$^2$ V = range rate = d(RD)/dt, ft/sec (for sign convention, V is positive with decreasing RD)

The time derivative of the slant range RD is processed by successive ALPHA-BETA filters to provide estimates of the range rate V and flight path acceleration, dV/dt. This processing effectively determines the kinetic energy dissipation rate of aircraft 10, normalized by weight. As defined above, positive polarity signals correspond to flight path acceleration and energize the arrays in a downwind to upwind sequence.

DRIFT RATE SIGNAL PROCESSING

Figure 5:
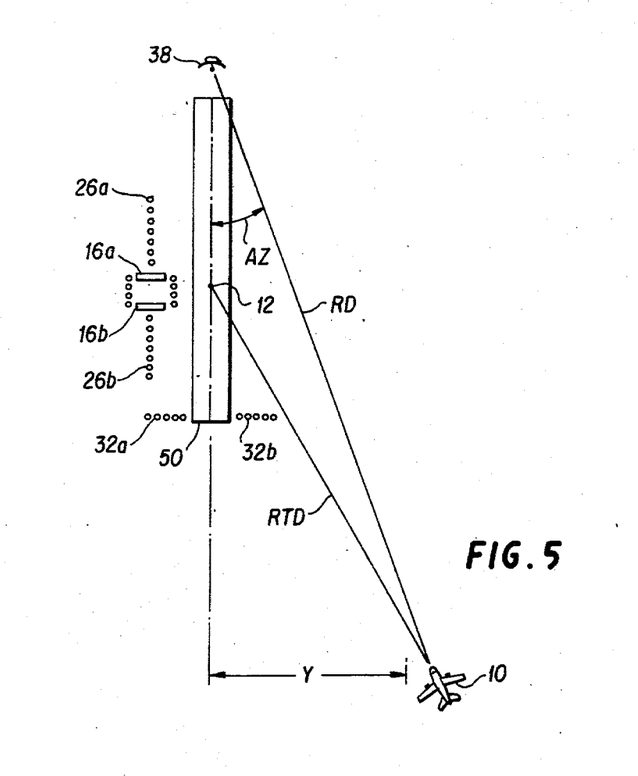
FIG. 5 is a general illustration in the azimuth plane of an aircraft approach using the display system of FIG. 2, depicting the reference nomenclature thereof.

Referring to FIG. 5, the drift rate signal processing produces a digital signal S3 indicative of cross-azimuth aircraft velocity, as follows:

$$S3 = (K3)(dY/dt), \text{ft/sec}$$

where
K3 = non-dimensional display gain,
Y is lateral offset of aircraft 10 from runway centerline 50 expressed in, ft,
Y = (AZ) × (RD) (positive when aircraft 10 is to the right of runway), and
AZ = MLS-derived aircraft azimuth angle from transmitter 38 to aircraft 10, expressed in radians.

The drift rate velocity dY/dt is generated by passing Y, the product of AZ and RD, through a recursive ALPHA-BETA filter. Polarity is such that left to right drift rates energize the right array 32b and right to left drift activates the left array 32a.

DISPLAY DRIVER MECHANIZATION

Based on the three control guidance formulations previously described herein, the signal processor 42 produces three discrete digital control signals and encodes the signal magnitude together with the algebraic sign bit (corresponding to polarity) for activation of each display. With reference again to FIG. 3, a common digital data bus 44 of conventional format (for example, MIL-STD 1553B) electrically interconnects signal processor 42 to display drivers 46a, 46b, and 46c. Signal processor 42 transmits the three digital signal levels and sign bits with respective digital address codes to corresponding display drivers 46a, 46b and 46c of conventional electronic design. The digital control signals S1, S2 and S3 received from signal processor 42 via data bus 44 are converted to analog control voltages n1, n2 and n3 having appropriate polarity reflecting the respective algebraic sign bit and serve to provide an interface for proper energization of the light cells 28 of horizontal arrays 26a, 26b, 30a, 30b, 32a, and 32b. Display drivers 46a, 46b, and 46c are polarity-sensitive and contain a plurality of amplitude-sensitive devices, such as triacs, equal in number (N) to the number of discrete light cells 28 in each horizontal light array 26a, 26b, 30a, 30b, 32a and 32b and each independently set to detect N distinct threshold levels of the analog control signal. As a result, display driver 46a generates either of a pair of outputs, corresponding to the upwind horizontal array 26a or the downwind array 26b, with each output having as many as N distinct driver signals for energizing successive ones of light cells 28 in the appropriate array.

Display driver 46c also generates either a pair of outputs corresponding to the left and right drift rate arrays 32a and 32b, with each output having as many as N distinct driver signals for likewise energizing successive light cells 28 in the arrays 32a and 32b.

Display driver 46b functions similarly, and a junction box 48 is connected to receive the output pair of N drive signals for distribution of each output line to the separate upwind and downwind halves of array pairs 30a and 30b, as depicted in FIG. 3.

The number of N distinct drive signals produced by display drivers 46a, 46b and 46c, which corresponds to the number of light cells illuminated in each array is determined by thresholds grouped, for example, as follows:

| n1, n2, n3 (volts ±) | N (No. of lights) |
|---|---|
| 0-0.5 | 0 |
| 0.5-1.5 | 1 |
| 1.5-2.5 | 2 |
| 2.5-3.5 | 3 |
| 3.5-4.5 | 4 |
| 4.5-5.5 | 5 |
| 5.5-6.5 | 6 |
| 6.5-7.5 | 7 |
| 7.5-8.5 | 8 |
| 8.5-9.5 | 9 |
| 9.5-10.0 | 10 |

AIRBORNE SUBSYSTEM OPERATION

Figure 6A:
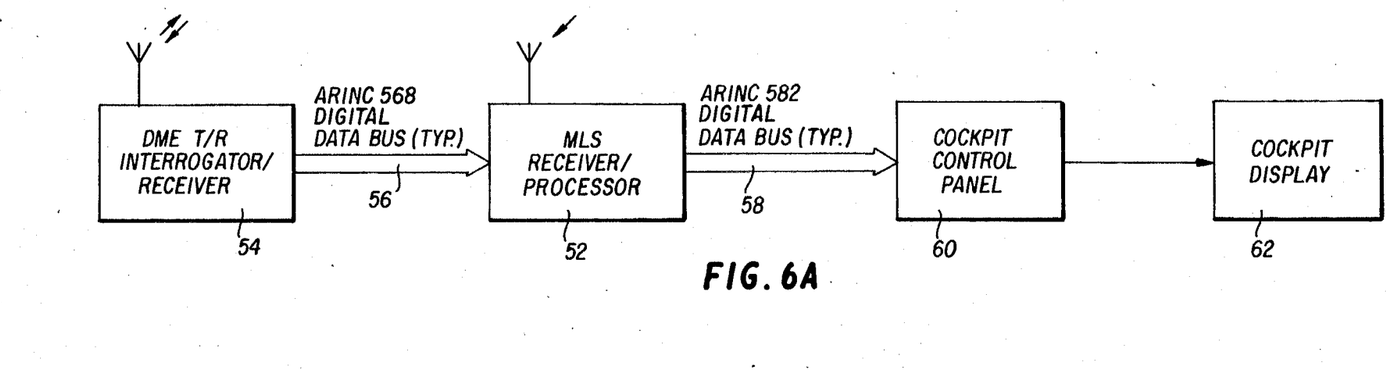
FIG. 6A is a block diagram of a typical aircraft MLS receiver and airborne subsystem.
Figure 6B:
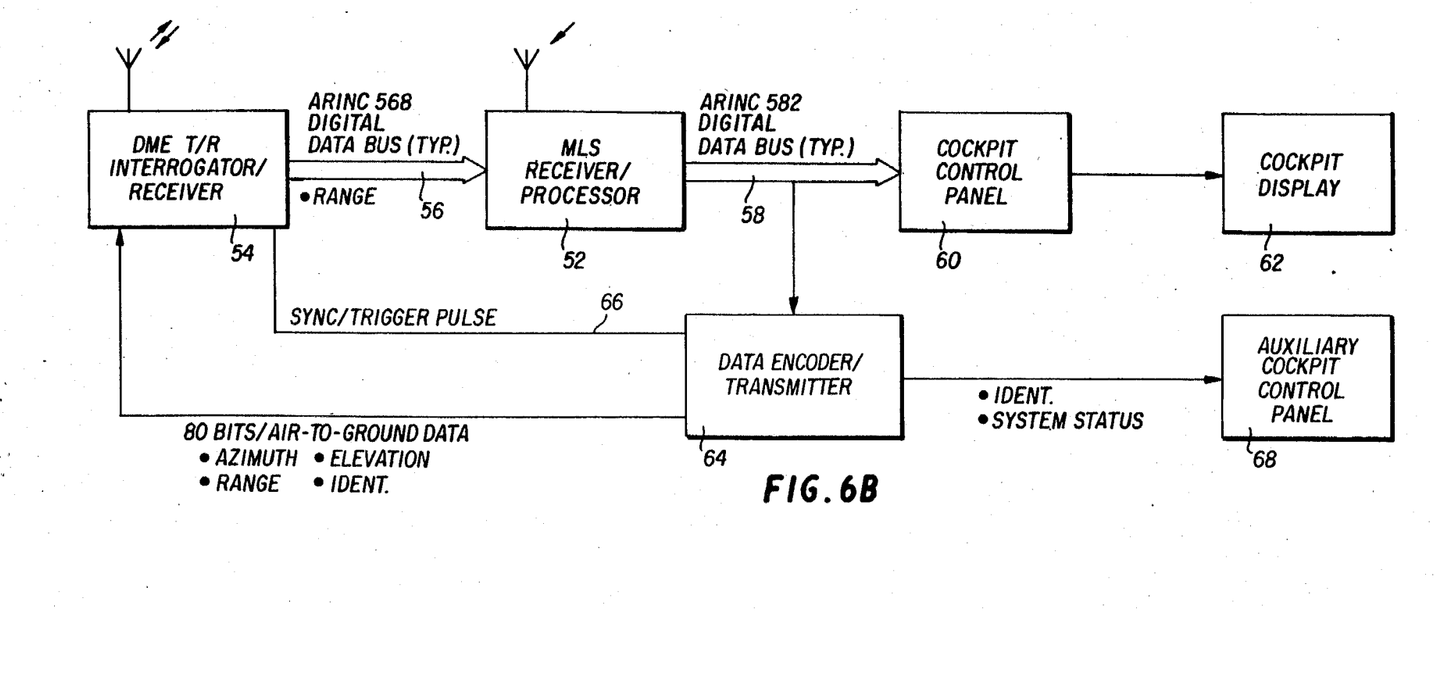
FIG. 6B is a block diagram of the FIG. 6A airborne system to which components pertaining to the present invention have been added.

With reference to FIGS. 6A and 6B, FIG. 6A depicts a typical aircraft MLS receiver and subsystem. The MLS angle receiver 52 receives and decodes the ground-transmitted MLS azimuth and elevation angles previously referred to herein, and obtains slant range data from a conventional DME interrogator/receiver (54) over a digital data bus (ARINC 568, for example) 56. The resulting digital elevation, azimuth and range data is passed via a second data bus 58 (ARINC 582, as depicted) to cockpit control panel 60 for processing and transmission of analog control signals to cockpit display 62.

FIG. 6B depicts the MLS airborne subsystem of FIG. 6A as modified by requirements of the present invention described herein. Specifically, data encoder/transmitter 64 of conventional design receives digital MLS elevation, azimuth and range data from digital data bus 58 described above, and encodes a discrete digital aircraft identity for subsequent transmission to the ground based data link receiver 40 of FIG. 3, previously referred to herein. DME T/R 54 antenna and components are used during off-duty cycle times for transmission of data from encoder 64. Approximately 80 bits are required to transmit one cycle of azimuth, elevation, identity and range data to the ground. Off-duty times are determined by encoder 64 from sync pulse 66 of DME T/R 54.

Additionally, MLS receiver 52 receives the returned discrete aircraft identity of encoder 64 over the MLS auxiliary data channel (not described herein . . . FAA specification FAA-ER-700-08C refers). This identity is passed to auxiliary cockpit control indicator panel 68 to provide a positive indication, for safety reasons, of the identity of the aircraft currently under guidance.

Based on the above description, it is apparent that the disclosed invention provides an improved landing aid system for remotely guiding the descent approach of a fixed-wing aircraft to conventional airport runways, visually presenting information more closely simulating the control order and dynamics of the actual feedback between the pilot commands and the aircraft response thereto. The disclosed electro-optical display system provides a remote visual landing aid that facilitates tracking of the desired glideslope during day or night operations so that the risks of landing accidents due to horizontal wind shear encounters are significantly reduced. Furthermore, the disclosed display system augments the VASI presently used to guide aircraft landings by enhancing the visual cueing information presented to the pilot through the addition of a visual indication of sink rate error, drift rate and energy dissipation rate. In addition, the present invention provides an improved visual landing aid system that does not add to vertical obstructions to the landing zone.

Obviously, other embodiments and modifications of the present invention will readily come to those of ordinary skill in the art having the benefit of the teachings presented in the foregoing description and drawings. For example, instead of using microwave landing system inputs, as described, to provide position and velocity data for processing, conventional optical or electro-optical tracking devices such as laser-related systems, infrared and video-contrast equipment, may be employed to practice the invention. Additionally, alternative arrangements and/or deletions of the display elements in relation to a VASI or PAPI display are possible. It is therefore to be understood that various changes in the details, materials, steps, and arrangement of parts, which have been described and illustrated to explain the nature of the invention, may be made by those skilled in the art within the principle and scope of the invention as expressed in the appended claims.

The embodiments of the invention in which an exclusive property or privilege is claimed are defined as follows:

1. A ground-based electro-optical visual display apparatus located on an airport surface adjacent to a runway, for providing remote three-axis flight path guidance to a pilot of an approaching aircraft for precise manual control in landing an aircraft along a desired flight path, comprising:

sensor means on said surface for producing a digital data signal representative of the identity of, and the instantaneous angular displacement of and slant range to the aircraft from the intended point of landing on a runway;

signal processor means on said surface electrically coupled to said sensor means to receive the digital data signal from said sensor means and governed in accordance with three control guidance algorithms for producing three discrete digital control signals, which when converted by said signal processor means to analog signals are amplitude and polarity representative of the instantaneous magnitude and direction, respectively, of the descent rate error, the change in aircraft speed representative of a wind shear condition, and the lateral drift rate of the aircraft;

and display means electrically coupled to said signal processor means to receive the three control signals from said signal processor means, said display means having light operating means which are amplitude and polarity responsive to the input signals for providing a continuously visible, horizontally disposed light bar indication to the pilot of the instantaneous magnitude and direction of descent rate error, the change in aircraft speed representative of a wind shear condition and the lateral drift rate of the aircraft.

2. An electro-optical visual display apparatus according to claim 1 wherein said display means comprises:

a first pair of longitudinally-positioned light arrays, comprising horizontally extending downwind and upwind linear arrays of discrete light cells arranged substantially parallel to the runway along one side of the runway and spaced part, the light cells of said downwind array being axially aligned with respective ones of said upwind array; the light cells in each array having a predetermined spacing to provide a continuously appearing light bar when activated;

a first pair of spaced apart transverse horizontal light arrays substantially perpendicular to said runway on said same side of said runway as said first pair of longitudinally positioned light arrays in the space separating said first pair of longitudinally-positioned horizontal arrays to provide a visual datum reference therebetween as a visual approach slope indicator; and first display drive means responsive at its input to the amplitude and polarity of a digital-to-analog converted signal representative of the magnitude and direction of the instantaneous aircraft descent error, and electrically coupled at its output to said first pair of longitudinally positioned light arrays, for continuously illuminating a predetermined number of discrete light cells in only one of the downwind and upwind arrays at any given instant in a direction either progressively upwind away from the upwind unit of said first pair of transverse arrays or downwind from the downwind transverse array, as governed by the polarity of the input signal; and where the number of continuously illuminated ones of said discrete light cells is in proportion to the amplitude of the input signal to produce a continuously appearing horizontally disposed bar of light representing the magnitude and direction of the instantaneous descent rate error.

3. The electro-optical visual apparatus of claim 2 wherein said display means further comprises:

a second pair of longitudinally positioned horizontal light arrays spaced apart and substantially parallel to each other and the runway and comprising a series of discrete light cells arranged in linear configuration, said second pair of horizontal light arrays interconnecting the respective endpoints of said first pair of transverse horizontal light arrays establishing a visual datum reference respectively therefrom; and second display drive means responsive at its input to the amplitude and polarity of a digital-to-analog converted signal representative of the magnitude and direction of the instantaneous change in aircraft speed representative of a wind shear condition, and electrically coupled at its output to said second pair of longitudinally positioned horizontal light arrays, for continuously illuminating corresponding discrete light cells in both of the arrays of the second pair of longitudinally positioned horizontal light arrays simultaneously and symmetrically in a direction progressively upwind away from the downwind unit of said first pair of transverse arrays or downwind from the upwind unit as governed by the polarity of the input signal as an indication of the change in aircraft airspeed representative of a wind shear condition and where the number of continuously illuminated light cells increases in proportion to the amplitude of the input signal to provide a pair of continuously appearing horizontally disposed light bars.

4. The electro-optical visual display apparatus of claim 3, wherein said display means further comprises:

a second pair of transverse horizontally positioned light arrays, each array comprising a series of discrete light cells in a linear configuration substantially perpendicular to and adjacent to the respective endpoints of left and right longitudinally extending runway borderline light arrays at the approach threshold with said borderline light arrays separating the left and right units of said second pair of transverse arrays and providing a visual datum reference therebetween; and third display drive means responsive at its input to the amplitude and polarity of a digital-to-analog converted signal representative of the magnitude and direction of the instantaneous lateral drift rate of the aircraft, and electrically coupled at its output to each of said second pair of transverse light arrays, for continuously illuminating a predetermined number of the discrete cells in only one of said pair of arrays at any given instant, in a direction either progressively left to right away from said right runway borderline light array, or right to left away from said left runway borderline light array as governed by the polarity of the input signal; and where the number of continuously illuminated discrete cells is in proportion to the amplitude of the input signal as to the magnitude of the instantaneous lateral drift rate and is visible as a continuously appearing horizontally disposed light bar.

* * * * *